Feb. 20, 1968    P. J. O'TOOLE ET AL    3,369,498
BALANCING VEHICLE LIFT
Filed Oct. 19, 1965

PHIL J. O'TOOLE
MILTON H. MATER
INVENTORS

BY
BUCKHORN, BLORE, KLARQUIST & SPARKMAN
ATTORNEYS 3,369,498
BALANCING VEHICLE LIFT
Phil J. O'Toole and Milton H. Mater, Corvallis, Oreg., assignors to The Auto-Lift Corporation, Corvallis, Oreg., a corporation of Oregon
Filed Oct. 19, 1965, Ser. No. 497,991
12 Claims. (Cl. 104—44)

ABSTRACT OF THE DISCLOSURE

A vehicle supporting track is mounted pivotally by a self-aligning bearing which is slidable and rotatable on an arbor carried by a turntable deck supported by an elevating mechanism. When the deck is raised, turntable rollers move up to, engage and lift the track away from a pair of balance fulcrum posts carried by a base. When the deck is in its lowermost position the turntable is away from the platform which is supported solely by the fulcrum posts. When a vehicle to be displayed is driven onto the track just slightly beyond a balanced position relative to the track, the track tilts in one direction on the fulcrum posts and actuates an audible indicator. The vehicle then is moved back slightly until the tilt track is removed and is braked in that position, in which the vehicle is balanced on the track. The elevating mechanism then lifts the track off the fulcrum through the turntable.

---

This invention relates to a balancing vehicle lift, and more particularly to a vehicle lift adapted to locate a vehicle thereon in a balanced position.

An object of the invention is to provide a balancing vehicle lift.

Another object of the invention is to provide a vehicle lift adapted to locate a vehicle thereon in a balanced position.

A further object of the invention is to provide a vehicle lift having a device for indicating when a vehicle thereon is centered thereon.

Another object of the invention is to provide a vehicle lift having a platform for receiving a vehicle and which is tipped when the vehicle is in an unbalanced position thereon together with means indicating when the platform is tipped.

The invention provides a vehicle lift having a tracked platform supported when in a lower loading position by a balance fulcrum and movable by a lift device to an elevated position. Preferably the platform is mounted on a self-aligning bearing slidable on and pivotal relative to a vertical arbor carried by a turntable deck supported by an elevating mechanism. When the deck is in an upper position, the platform is supported rotatably by a plurality of turntable rollers supported by the deck and positioned above the deck and equidistant from the arbor. When the elevating mechanism is actuated to lower the deck to a loading and unloading position, the deck lowers a pair of fulcrum sockets on the bottom of the platform onto a pair of upstanding fulcrum posts and then moves slightly farther downwardly so that the platform is supported for limited tilting or tipping movement by the fulcrum posts. The posts are spaced at opposite sides of the bearing on a line extending through the bearing and transversely to tracks on the platform. When a vehicle to be lifted and displayed by the lift is driven onto the tracks to a position overbalancing the platform forwardly, the platform tips forwardly and actuates a limit switch to energize a buzzer. The vehicle then is backed until the vehicle is balanced over, which causes the platform to tip back enough to open the limit switch to stop the buzzer. The elevating mechanism then is actuated to raise the deck and the turntable rollers are raised up to the platform and raise the platform up off the fulcrum posts.

A complete understanding of the invention may be obtained from the following detailed description of a balancing vehicle lift forming a specific embodiment thereof, when read in conjunction with the appended drawings, in which.

Figure 1:
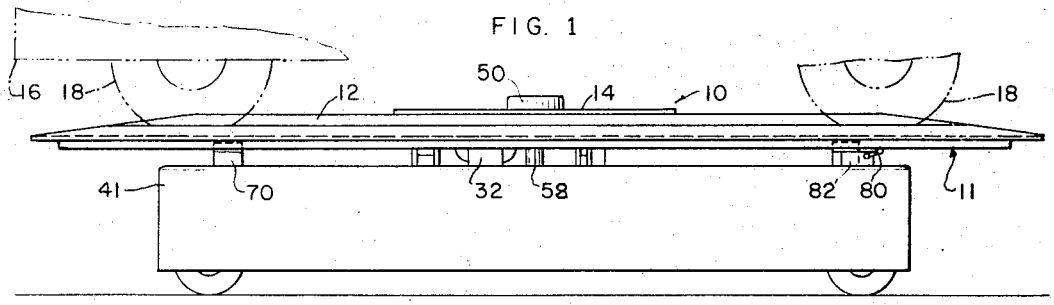
FIG. 1 is a side elevation view of a balancing vehicle lift forming one embodiment of the invention and a vehicle thereon.

Referring now in detail to the drawings, there is shown therein a mobile, collapsible display device forming one embodiment of the invention. The display device includes a turntable 10 including a table or platform 11 having a pair of parallel, channel-like tracks 12 secured rigidly to a cross plate 14 and adapted to have an automobile or other vehicle 16 driven thereon and support all four wheels 18 of the automobile. The table 11 is adapted to rest on and rotate on two idler rollers 22 and a drive roller 23 carried by brackets 20 fixed to a reck or frame 24. If desired, a ring (not shown) may be secured to the bottom of the crossplate for engagement by the rollers. The deck 24 is substantially identical in construction and operation to the deck 12 disclosed in our Patent 3,024,738, and with the rollers 22 and 23 forms the base and supporting structure of the turntable. An electric motor 32 drives the drive roller through a chain and sprocket drive 33 to rotate the table 11 with the automobile 16 thereon. The deck 24 with the table 11 thereon is adapted to be raised and lowered by a lift or elevating mechanism 34 like that disclosed by our above-mentioned patent. The elevating mechanism is carried by a base 36. Telescopic skirt sections 38, 39 and 40 bearing advertising are adapted to be raised and lowered with the deck 24 relative to an outer skirt section 41 like the skirt sections disclosed in our above-mentioned patent.

Figure 3:
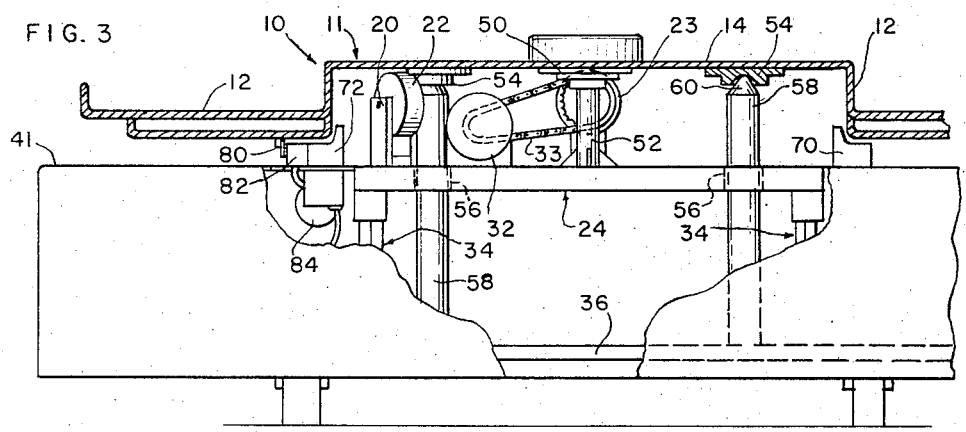
FIG. 3 is a vertical sectional view taken substantially along line 3—3 of FIG. 2.

The crossplate 14 has a self-aligning bearing 50 (FIG. 3) slidable along and rotatable on an arbor 52 carried by the deck 24 directly below the center of gravity of the table. The arbor is midway between and along the tracks. When the deck 24 is raised it raises the table 11 and the skirt section 40. The skirt sections 38 and 39 are raised by the section 40 and the skirt sections are telescoped as they are so raised. With the table 11 and the automobile 16 thereon in elevated positions, the table rests on the rollers 22 and 23 and the motor 32 may be energized to rotate the table through the drive roller 23.

When it is desired to replace the automobile 16 with a different automobile to be displayed, the elevating mechanism 34 is actuated to lower the turntable and automobile 16 to the lowered positions thereof shown in the drawings. Before this lowering is started, the table 11 is rotated to a position in which fulcrum sockets 54 (FIGS. 2 and 3) are vertically aligned with clearance holes 56 in the deck 24 and fulcrum posts 58 fixed to the base 36, and having tapered, rounded upper end portions 60. The centers of the sockets 54 are on a horizontal line passing through the center of gravity of the table 11 and transverse to the tracks 12. With the table in this position the deck and turntable are lowered to their lowermost position shown in FIG. 3. During the last portion of the downward movement of the table and deck, the clearance holes 56 move onto the fulcrum posts and downwardly therealong, and, just before the deck reaches its lowermost position, the sockets 54 move onto the upper ends of the posts 58, which stops further downward movement of the table while the deck with the rollers 22 and 23 move on down slightly to provide clearance for tipping of the table. A low ramp (not shown) then is placed at the lefthand end of the tracks 12, as viewed in FIGS. 1 and 2, and the automobile is driven off the tracks, a pair of posts 70 carried by the base 36 serving to limit rearward tipping of the table after a slight tipping movement thereof.

Figure 2:
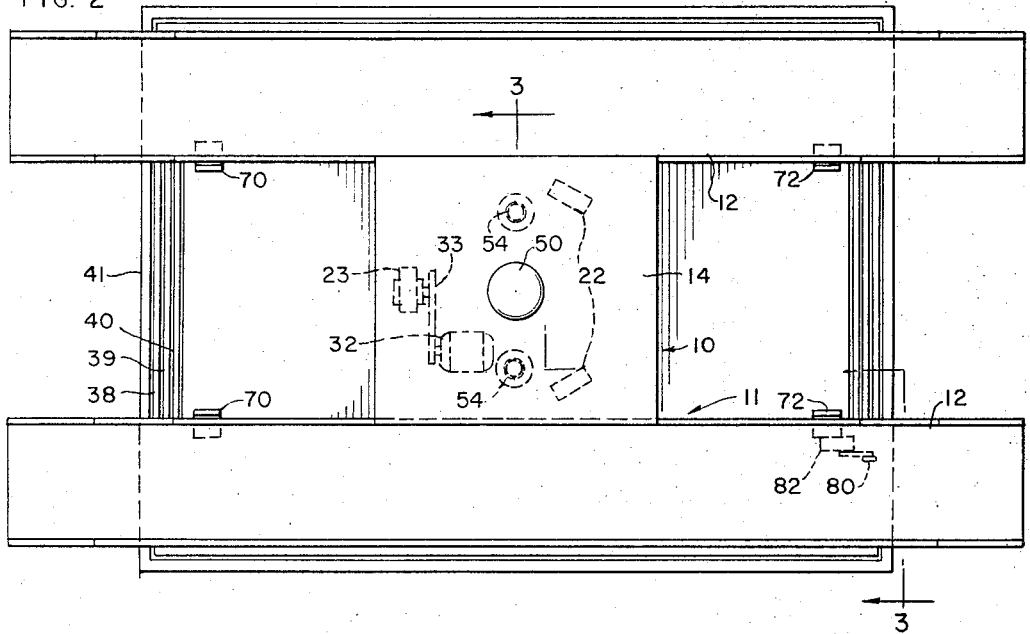
FIG. 2 is a top plan view of the vehicle lift of FIG. 1.

To locate the automobile 16 in a balanced position on the turntable 10, the automobile is driven off the ramp (not shown) at the lefthand end of the tracks 12, as viewed in FIGS. 1 and 2. As the automobile moves to the right and approaches its balanced position, the tracks rest on the posts 70. The automobile is moved very slowly as it approaches the balanced position and is moved slightly to the right of the balanced position. When the automobile moves to the right of the balanced position, the table 11 is thereby tipped slightly in a clockwise direction, as viewed in FIG. 1, and the tracks 12 lift off of the posts 70 and swing down onto posts 72, which stop the tipping movement and support the platform with the fulcrum posts 58. As the table 11 is so tipped, one of the tracks 12 engages and moves an arm 80 of a limit switch 82 mounted on the base 36. This movement of the arm 80 completes a circuit to a buzzer 84 (FIG. 3) to actuate the buzzer to indicate that the automobile is in an unbalanced position. The automobile then is backed very slowly on the tracks 12 until it reaches its balanced position which is indicated by the table tipping counter-clockwise, as viewed in FIG. 1, to permit the spring-pressed limit switch arm 82 to move back to its upper position to open the circuit to and de-energize the buzzer. This indicates to the driver of the automobile that the automobile is in a balanced position on the table 11 and he stops the automobile at that time. Then, the elevator mechanism 34 is actuated to raise the deck 24, and the rollers 22 and 23 engage and lift the table with the automobile thereon off the fulcrum posts 58 and raise it to the upper, display position, in which the table can be rotated about the arbor 52. The automobile being balanced with its center of gravity midway between the three supporting rollers 22 and 23, lateral forces on the bearing 50 and arbor 52 are minimized and the load is equally distributed at all times on the rollers 22 and 23 and is centered at all times relative to the deck 24 and elevating mechanism 34.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a vehicle lift,
track means adapted to have a vehicle moved therealong,
lift means for moving the track means from a lower position to an elevated position and supporting the track means while it is in the elevated position and is moved from the lower position thereto,
balance means engaged by the track means at least when the lift means is in the lower position thereof for supporting the track means for limited tipping movement of the track means when the vehicle is in an unbalanced position on the lift means,
and means for indicating when the track means is tipped by the vehicle.

2. In a vehicle lift,
a turntable including upper, track means adapted to have a vehicle moved therealong and lower supporting means adapted to support the track means,
lift means for moving the turntable from a lower position to an elevated position and supporting the turntable while it is in the elevated position,
balance means engaged by the track means when the lift means is in the lower position thereof for supporting the track means for tipping movement of the track means relative to the supporting means when the vehicle is in an unbalanced position relative to the lift means,
and means for indicating when the track means is tipped by the vehicle.

3. In a vehicle lift,
pivot means,
a rigid platform having tracks thereon for supporting a vehicle thereon and having connecting means adapted to rest on the pivot means to support the platform on the pivot means for tipping movement when a vehicle on the platform is in an unbalanced position thereon and to permit the platform to be lifted off the pivot means,
support means for supporting the platform,
means mounting the support means movably between a lower position out of supporting relationship with the platform and an upper position supporting the platform in an elevated position in which the platform is above and not supported by the pivot means,
and lift means for moving the mounting means between the lower position and the upper position thereof.

4. In a vehicle lift,
a base,
pivot means supported on the base in a fixed position projecting upwardly,
a rigid platform having tracks thereon for supporting a vehicle thereon and having connecting means adapted to rest on the pivot means to support the platform on the pivot means for tipping movement when a vehicle on the platform is in an unbalanced position thereon and to permit the platform to be lifted off the pivot means,
means adapted to support the platform,
means mounting the turntable means for movement between a lower position out of supporting relationship with the platform in which the platform rests on the pivot means and an upper position supporting the platform in an elevated position in which the platform is above and not supported by the pivot means,
and lift means for moving the mounting means between the lower position and the upper position thereof.

5. In a vehicle lift,
turntable means including track means adapted to have a vehicle moved therealong, means for supporting the track means rotatably and lost motion means mounting the track means for relative vertical movement of the track means and the supporting means,
lift means for moving the supporting means from a lower position to an elevated position and supporting the supporting means while it is in the elevated position and is moved from the lower position,
balance means engaged by the track means when the supporting means is in the lower position thereof for supporting the track means for tipping movement of the track means when the vehicle is in an unbalanced position on the track means,
and means for indicating when the track means is tipped by the vehicle.

6. In a vehicle lift,
a pair of vertical fulcrum posts,
a lift platform having a pair of tracks adapted to have an automobile driven thereonto when in a lower position near the ground level, a pair of fulcrum sockets adapted to be supported pivotally on the posts and support the lift platform in a substantially balanced condition for limited tipping movement of the platform when the platform is in the lower position thereof, indicating means operable py the platform when the platform is tipped in one direction by a vehicle in an unbalanced position on the platform, and lift means for lifting the platform away from the posts to an elevated position completely free of the posts.

7. In a vehicle lift, a pair of vertical fulcrum posts having tapered upper ends, a lift platform having a pair of tracks adapted to have an automobile driven thereonto when in a lower position at the ground level, a pair of fulcrum sockets adapted to be supported pivotally on the posts and support the lift platform in a substantially balanced condition for limited tipping movement of the platform when the platform is in the lower position thereof, indicating means operable by the platform when the platform is tipped in one direction by a vehicle in an unbalanced position on the platform, and lift means for lifting the platform away from the posts to an elevated position completely free of the posts.

8. In a vehicle lift, a pair of vertical fulcrum posts, a lift platform having a pair of tracks adapted to have an automobile driven thereonto when in a lower position at the ground level, turntable means, a pair of fulcrum sockets adapted to be supported pivotally on the posts and support the lift platform in a substantially balanced condition for limited tipping movement of the platform when the platform is in the lower position thereof, indicating means operable by the platform when the platform is tipped in one direction by a vehicle in an unbalanced position on the platform, and lift means for lifting the turntable means from a lower position not supporting the platform to engage the platform and lift it away from the posts to an elevated position completely free of the posts.

9. In a vehicle lift, a frame, a lift platform having a pair of tracks thereon, turntable means mounting the platform rotatably on the platform and for limited vertical movement of the platform relative to the frame between a lower position supported rotatably by the frame and an upper position pivotal relative to the frame about a horizontal axis in the plane of the center of gravity of the platform, means for raising and lowering the turntable means between an upper position and a lower position, and fulcrum means adapted to be engaged by a portion of the platform on said axis and hold the platform against movement with the frame when the frame is moved to the lower position of the frame to cause the platform to assume its upper position relative to the frame.

10. In a vehicle lift, a frame, a lift platform having a pair of tracks thereon, turntable means mounting the platform rotatably on the platform and for limited vertical movement of the platform relative to the frame between a lower position supported rotatably by the frame and an upper position pivotal relative to the frame about a horizontal axis in the plane of the center of gravity of the platform, means for raising and lowering the turntable means between an upper position and a lower position, and fulcrum means mounted in a fixed position adapted to be engaged by a portion of the platform on said axis and hold the platform against movement with the frame when the frame is moved to the lower position of the frame to cause the platform to assume its upper position relative to the frame.

11. In a vehicle lift, a lift platform having a pair of parallel tracks and a center of gravity positioned on a predetermined vertical axis positioned midway between the tracks and midway along the tracks, vertical, self-aligning bearing means mounted on the platform at the center of gravity thereof, first fulcrum means mounted on the bottom of the platform at opposite sides of said vertical axis and on a horizontal axis intersecting said vertical axis and transverse to the tracks, a frame, a vertical arbor on the frame slidably engaging the bearing means and permitting the bearing means to rotate around the arbor, the arbor and the bearing means permitting limited tipping movement of the platform relative to the frame when the bearing means is in an upper position on the arbor, turntable means centered on the arbor and carried by the frame for engaging and supporting the platform when the bearing means is in a lower position on the arbor, lift means for raising and lowering the frame between a raised position and a lowered position, second fulcrum means positioned to engage the first fulcrum means and hold the platform against downward movement with the lift means during the latter portion of the downward movement of the lift means to the lowered position thereof and hold the frame in a substantially balanced position and permitting tipping movement of the frame in one direction when a vehicle on the frame is in a position unbalancing the frame in that direction, and indicator means in a position adapted to be moved by the frame when the frame is on the fulcrum posts and is tipped.

12. In a vehicle lift, a lift platform having a pair of parallel tracks and a center of gravity on a predetermined vertical axis positioned midway between the tracks and midway along the tracks, vertical self-aligning bearing means mounted on the platform at the center of gravity thereof, a pair of downwardly directed fulcrum sockets mounted on the bottom of the platform on opposite sides of said vertical axis and on a horizontal axis intersecting said vertical axis and transverse to the tracks, a frame, a vertical arbor on the frame slidably engaging the bearing means and permitting the bearing means to rotate around the arbor, the arbor and the bearing means permitting limited tipping movement of the platform relative to the frame when the bearing means is in an upper position on the arbor, turntable means centered on the arbor and carried by the frame for engaging and supporting the platform when the bearing means is in a lower position on the arbor, lift means for raising and lowering the frame between a raised position and a lowered position, a pair of vertical fulcrum posts having tapered, rounded upper end portions positioned to enter the fulcrum sockets and hold the platform against downward movement with the lift means during the latter portion of the downward movement of the lift means to the lowered position thereof and hold the frame in a substantially balanced position and permitting tipping movement of the frame in one direction when a vehicle on the frame is in a position unbalancing the frame in that direction, a limit switch having an actuator in a position adapted to be moved by the frame when the frame is on the fulcrum posts and is tipped, indicator means operable by the limit switch, and stop means for limiting the extent of tipping of the frame.

References Cited

UNITED STATES PATENTS

| 1,472,792 | 11/1923 | Dodge | 104—44 |
| 3,081,400 | 3/1963 | Zion | 200—85 |
| 3,232,448 | 2/1966 | Browne | 104—44 |

ARTHUR L. LA POINT, *Primary Examiner.*

D. F. WORTH, *Assistant Examiner.*